United States Patent
Pokharna et al.

(10) Patent No.: US 6,837,057 B2
(45) Date of Patent: Jan. 4, 2005

(54) DOCKING STATION TO COOL A COMPUTER

(75) Inventors: Himanshu Pokharna, San Jose, CA (US); Eric DiStefano, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/334,763

(22) Filed: Dec. 31, 2002

(65) Prior Publication Data

US 2004/0123604 A1 Jul. 1, 2004

(51) Int. Cl.[7] .......................... F25B 21/02; F25D 23/12; H05K 5/00
(52) U.S. Cl. .......................... 62/3.2; 62/259.2; 361/687
(58) Field of Search .................. 62/3.3, 3.2, 3.62, 62/259.2; 361/687, 683, 686, 696; 165/80.2, 80.3

(56) References Cited

U.S. PATENT DOCUMENTS

| | | | | |
|---|---|---|---|---|
| 5,664,118 A | * | 9/1997 | Nishigaki et al. | 710/304 |
| 5,704,212 A | * | 1/1998 | Erler et al. | 62/3.2 |
| 5,890,371 A | * | 4/1999 | Rajasubramanian et al. | 62/259.2 |
| 6,038,128 A | * | 3/2000 | Hood et al. | 361/687 |
| 6,173,576 B1 | * | 1/2001 | Ishida et al. | 62/3.7 |
| 6,191,943 B1 | * | 2/2001 | Tracy | 361/687 |
| 6,226,994 B1 | * | 5/2001 | Yamada et al. | 62/3.7 |
| 6,646,874 B2 | * | 11/2003 | Pokharna et al. | 361/687 |

FOREIGN PATENT DOCUMENTS

JP 2000165077 A * 6/2000 ............ H05K/7/20

* cited by examiner

*Primary Examiner*—Chen Wen Jiang
(74) *Attorney, Agent, or Firm*—Blakely, Sokoloff, Taylor & Zafman LLP

(57) ABSTRACT

A docking station is provided with a thermoelectric module to generate cool air of a first temperature to be fed into a docked computer.

17 Claims, 4 Drawing Sheets

DOCKING STATION TO COOL A COMPUTER

BACKGROUND

Faster and more powerful computer components allow the design and construction of higher performance portable computing devices such as laptop or notebook computers. Unfortunately, the use of such faster and more powerful computer components often results in increased heat generation by such computing devices. Thus, improved heat dissipation technology is often needed to maintain operating temperatures of portable computing devices within the same range as their predecessors or some other acceptable range.

A portable computing device typically includes a base and a screen which are rotatably attached by a hinge. The base usually has an input device such as a keyboard or a touchpad as well as a number of electronic components. Integrated circuits with the highest clock frequency are typically located in close proximity to each other within the computer base.

Many heat generating computer system components take the form of integrated circuits. Such integrated circuits are typically mounted on a motherboard or another circuit board within the base of the portable computer system. A processor is one component that generates a large amount of heat in a typical processor system. Other electrical components which also generate heat include memory circuits, power supply circuits, and circuit boards such as a video card.

Maintaining operating temperatures of computer system components below certain levels is important to performance, reliability, and safety. Most integrated circuits have specified maximum operating temperatures, above which the manufacturer does not recommend operation. Transistors, the building blocks of integrated circuits, tend to slow down as operating temperature increases. Thus, a computer system that operates its integrated circuits close to or beyond recommended timings may fail as temperature increases.

Additionally, integrated circuits may be physically damaged if temperatures elevate beyond those recommended. Such physical damage obviously can impact system reliability. Finally, the computer system casing should be kept at a temperature which is safe for human contact. This may necessitate dissipation of heat throughout a computer system base or efficiently expelling heat to avoid hot spots near certain components such as a processor.

Typically, heat sinks, fans, and heat pipes are employed to dissipate heat from integrated circuits and other electronic components. Increases in heat generation are often accommodated by simply increasing the quantity or size of these heat dissipation elements. The relatively small size of a portable computing device, however, complicates heat dissipation by limiting airflow, crowding heat generating components, and reducing the space available for heat dissipation devices.

Since the computer base size is generally kept to a minimum, and the computer base contains both the input device and numerous other electronic components, there may be inadequate space to dissipate enough heat to keep the electronic components within their acceptable range of operating temperatures. Additionally, heat dissipation through the bottom of the base is limited because the computer is usually operated on a relatively flat low conductance surface.

One prior art method for removing heat from the base of a portable computing device involves transferring heat from the base of the device to the display. The technique of transferring heat to the display is limited due to the thermal and mechanical difficulties involved with transferring heat through the hinge of the computing device.

BRIEF DESCRIPTION OF THE DRAWINGS

The present invention, in one embodiment, is illustrated by way of example and not limitation in the figures of the accompanying drawings, in which like references indicate similar elements, and in which.

DETAILED DESCRIPTION

A method and apparatus is disclosed for cooling a portable computer, wherein a docking station reduces the temperature of the internal chambers of the computer. In the following description, for purposes of explanation, specific details are set forth to provide a thorough understanding of the description. However, it will be apparent to one skilled in the art that these specific details are not required in order to practice the description. For example, the descriptions as provided herein directed to a docking station, would also apply to a port replicator, and other related devices. In addition, the description as provided herein refers to computers interchangeably as portable computers, laptop computers, and notebook computers.

Figure 1:
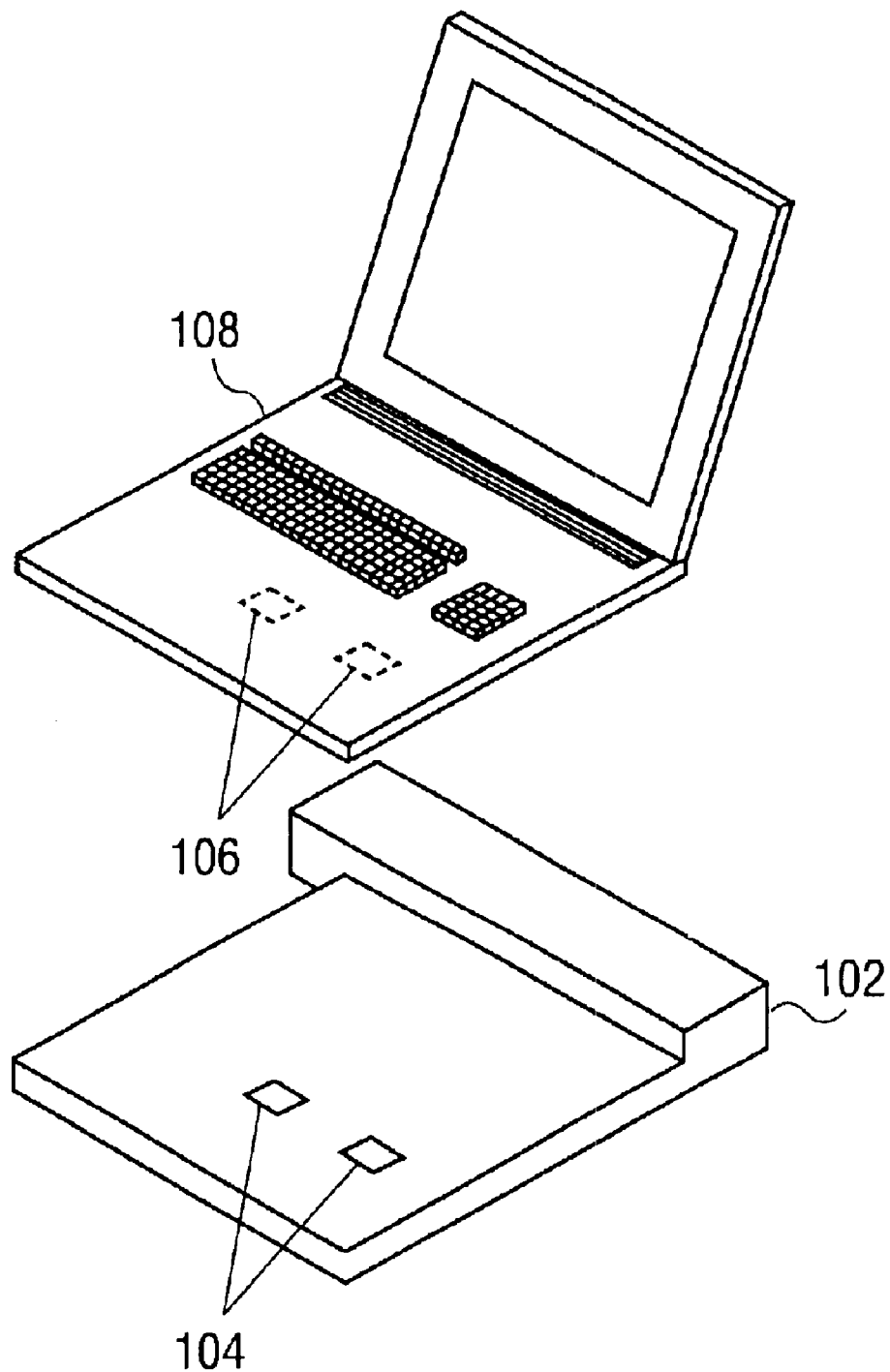
FIG. 1 illustrates an isometric view of the docking station and computer according to one embodiment.

In one embodiment, as illustrated in FIG. 1, a docking station 102 is provided with one or more openings/apertures 104 that line up with openings/apertures 106 in the notebook 108. When the notebook 108 is docked on the docking station 102, cooler air is forced into the notebook 108 through the openings 104 of the docking station 102 and the openings 106 of the notebook.

As further illustrated in FIG. 1, the apertures of the notebook computer are located on the bottom of the notebook computer to align with apertures on the surface of the docking station. In alternative embodiment, the apertures of the notebook computer and docking station may be provided in different and/or separate locations.

For example, the apertures may be provided on the sides of the notebook computer to align with apertures provided on the internal sides of the docking station. Furthermore, the number of apertures provided and the size of the apertures may also vary.

Figure 2:
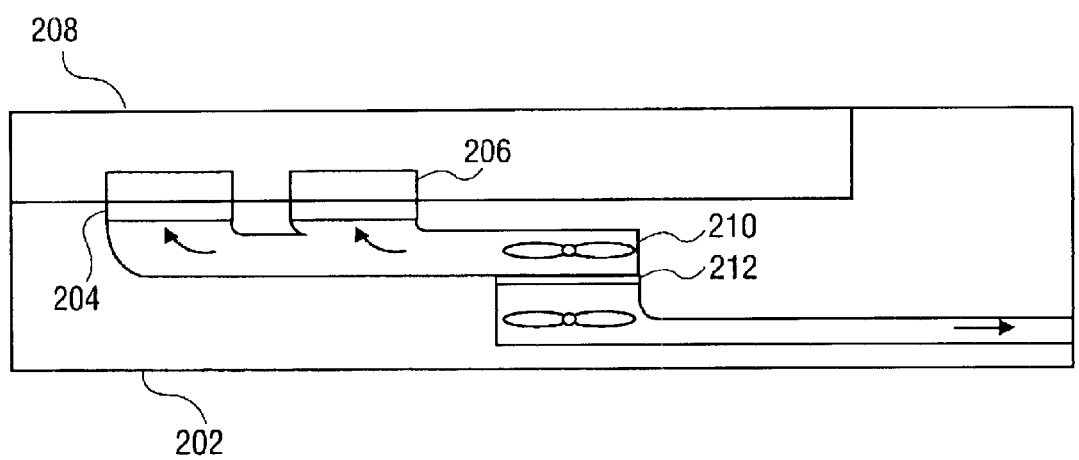
FIG. 2 illustrates a cut-a-way side view of the docking station and computer according to one embodiment.

As illustrated in FIG. 2, in one embodiment, the docking station 202 includes a unit 210 (e.g., a fan) to force air into the notebook computer 208 via the apertures of the docking station 204 and appretures of the notebook computer 206. In one embodiment, the unit 210 in the docking station to force air into the notebook computer positively pressurizes the internal chamber of the notebook computer by forcing air into the notebook computer with an air pressure higher than air is released by the notebook computer. In one embodiment, the notebook computer includes vents (not shown) that decrease the release of air from the internal chamber of the computer notebook to assist in creating positively pressurized internal chamber of the notebook computer.

In one embodiment, also illustrated in FIG. 2, the docking station includes a unit 212 to generate sub-ambient temperature air to be forced into the notebook computer (wherein the air forced into the notebook computer is of a lower temperature than the ambient air within the internal chamber of the notebook computer).

Figure 3:
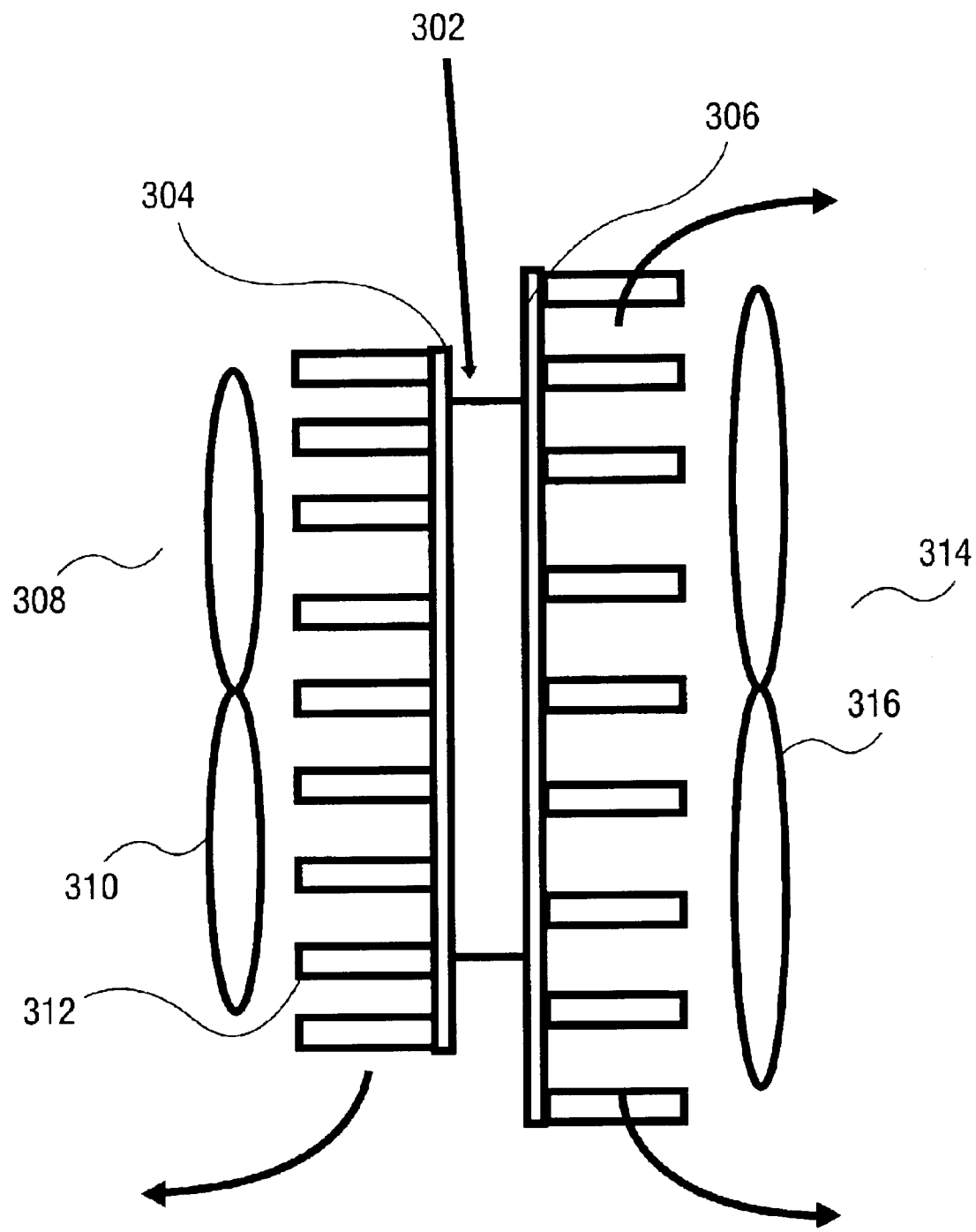
FIG. 3 illustrates a thermoelectric module according to one embodiment.

In one embodiment, the unit 212 to generate the sub-ambient temperature is a thermoelectric module. The thermoelectric module 302, as illustrated in FIG. 3, includes one side 304 that generates cool temperature (i.e., below the ambient air). The thermoelectric module also includes a second side 306 that generates warmer temperatures, as a result of energy pumped from the first cool side. In one embodiment, the thermoelectric module operates on DC power of 12 volts with a Qmax of 70 watts. In addition, in one embodiment, the thermoelectric module has a form factor of 40 mm×40 mm, and may be 3–5 mm in thickness. In alternative embodiments, the electrical specifications and dimensions of the thermoelectric module may vary.

In one embodiment, the thermoelectric module, as illustrated in FIG. 3, includes a heat exchanger 308 mounted on the first cool side of the thermoelectric module. In one embodiment, the heat exchanger includes a fan 310 generating a flow of air against the first cool side 304 of the thermoelectric module. The flow of cool air that is generated by the fan blowing against the cool side 304 of the thermoelectric module is feed into one or more ducts (as illustrated in FIG. 2) that transfer the flow of cool air to one or more of the fore mentioned vents of a notebook computer that may be docked.

In addition, in one embodiment, the heat exchanger mounted to the first side of the thermoelectric unit may include fins 312 to conduct the cooler temperature away from the first side of the thermoelectric unit. The fan of the heat exchanger could be positioned parallel to the fins of the heat exchanger (as shown in FIG. 2), or alternatively perpendicular, to generate a flow of air across the fins of the heat exchanger.

The second opposite side 306 of the thermoelectric module, in one embodiment, may also include a heat exchanger 314 to dissipate the energy pumped from the cold side as well as the energy/power input into the thermoelectric module to operate the thermoelectric module. The heat exchanger on the second side of the thermoelectric module, in one embodiment, also includes a fan 316 to dissipate heat from the docking station. The warm air can be transferred away from the thermoelectric module 212 via a duct (as shown in FIG. 2), and released external to the docking station. In one embodiment, the heat exchanger on the second side of the thermoelectric module is larger than the heat exchanger on the first side of the thermoelectric module.

In addition, in one embodiment, the heat exchanger mounted to the second side of the thermoelectric unit may also include fins 318 to conduct the warmer temperature from the second side of the thermoelectric module. The fan could, as well, be positioned parallel to the fins of the heat exchanger, or alternatively perpendicular, to generate a flow of air across the fins of the heat exchanger.

In an alternative embodiment, the heat exchanger on the second side of the thermoelectric module includes a heat pipe (not shown) to transfer heat from the second side (i.e., the warmer side) to a remote location inside or outside the docking station. The heat pipe may lead to a remote heat exchanger.

Figure 4:
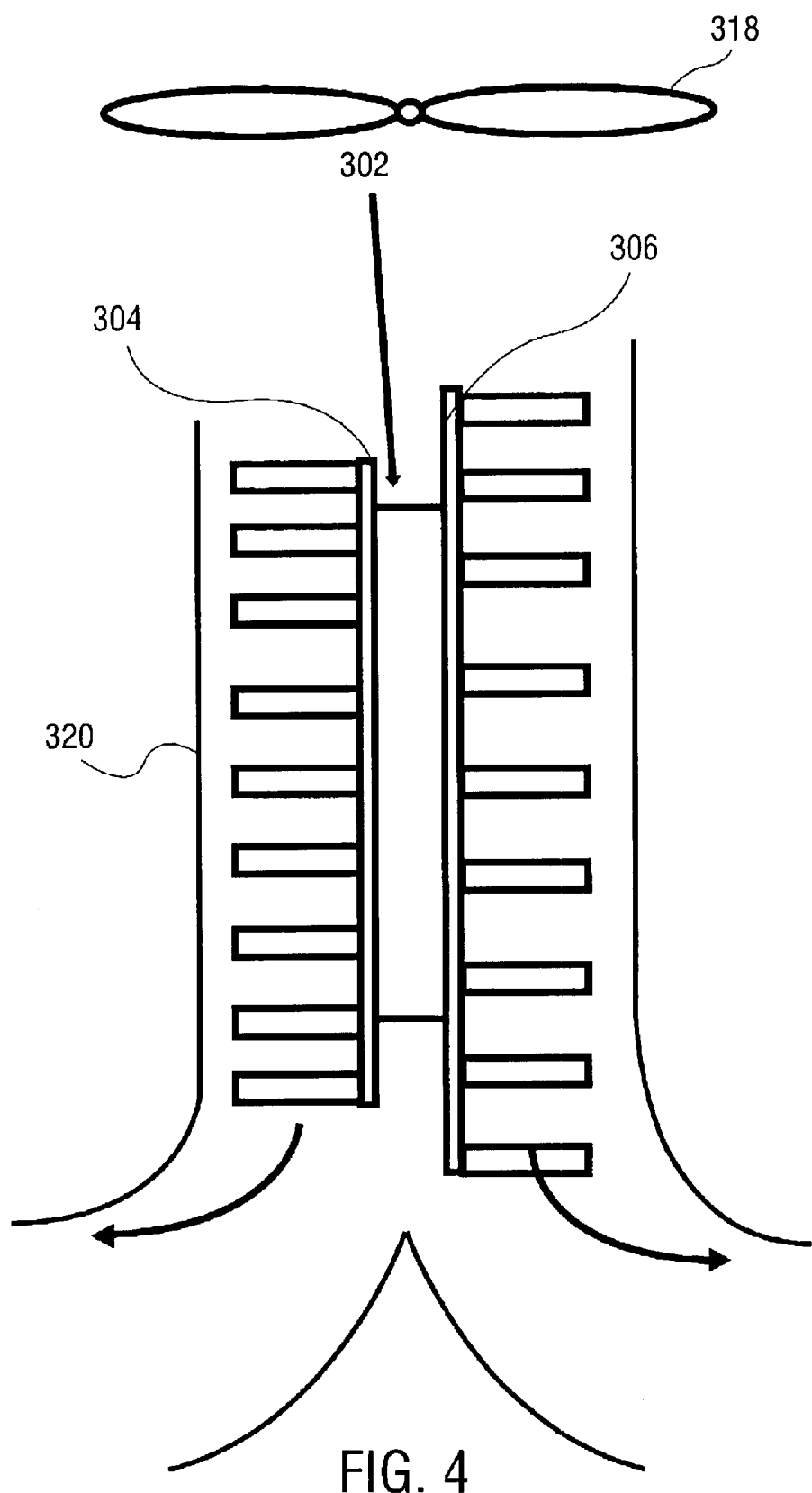
FIG. 4 illustrates a thermoelectric module according to an alternative embodiment.

In yet another alternative embodiment, as illustrated in FIG. 4, a fan 318 may be positioned perpendicular to the thermoelectric module to generate a flow of air across both the first 304 and second 306 sides of the thermoelectric module. In the alternative embodiment illustrated in FIG. 4, a duct 320 may be provided to direct the flow of the cooler air, produced on the first side of the thermoelectric module, to the notebook computer. The duct 320 may also include a channel to transfer the warmer air, produced by the second side of the thermoelectric module, away from thermoelectric module.

In one embodiment, when the notebook computer is docked into the docking station, a thermometer (not shown) from the docking station may extend up into the internal chamber of the notebook computer via the aligned apertures. The thermometer from the docking station may measure the ambient temperature within the notebook computer to have the thermoelectric unit 212 within the docking station generate sub-ambient temperature air accordingly (e.g., if the ambient air within the notebook computer is warmer, cooler air would be generated). A controller, to receive a signal from the thermometer, could be included in the docking station to monitor the temperature within the docked notebook computer and to control when and to what extent additional cooling is to be generated. For example, when the internal ambient temperature of the notebook computer reached and/or exceeded a predetermined threshold, the thermoelectric module may be used to generate cooler air feed into the notebook computer.

In an alternative embodiment, in addition to monitoring the ambient temperature inside a docked notebook computer, the humidity may also be monitored. For example, when the humidity and temperature, reach and/or exceed some predetermined combination threshold, the thermoelectric unit may be used to reduce the ambient temperature of the docked notebook computer to reduce possible condensation within the computer.

Alternatively, a thermal diode may be included in a unit (e.g., a processor) of a docked notebook computer, to monitor the temperature of the unit, and have the ambient air of the computer reduced when a temperature of the unit is at least equal to predetermined threshold (e.g., 100 celcius for a central processing unit). For example, in one embodiment, one of the connectors between the notebook computer and the docking station, may provide a signal communicating the temperature of the unit to the docking station, to allow the docking station to determine when the ambient air of the computer should be reduced. In alternative embodiments, alternative techniques for determining the ambient air temperature within the notebook computer and adjusting the temperature of the air forced into the notebook computer may be implanted.

In the foregoing specification the techniques have been described with reference to specific exemplary embodiments thereof. It will, however, be evident that various modifications and changes may be made thereto. The specification and drawings are, accordingly, to be regarded in an illustrative rather than restrictive sense.

What is claimed is:

1. An apparatus comprising:
   a housing to dock a computer;
   a first side of a thermoelectric module to generate cool air of a first temperature, the air of the first temperature to be feed into a computer to be docked in the apparatus, exclusive of a duct extending into the apertures of the computer, and a second side of the thermoelectric module to generate warm air of a second temperature, the warm air higher in temperature compared to the cool air, a heat exchanger with a fan on the first side of the thermoelectric module; and a second heat exchanger with a fan on the second side of the thermoelectric module.

2. The apparatus of claim 1, wherein the apparatus further includes a duct to transfer the cool air from the thermoelectric module to the computer to be docked in the apparatus.

3. The apparatus of claim 2, wherein the heat exchanger on the first side of the thermoelectric module is smaller than the heat exchanger on the second side of the thermoelectric module.

4. The apparatus of claim 1, wherein a heat pipe is attached to the second side of the thermoelectric module, the heat pipe to transfer heat from the second side to a remote heat exchanger.

5. The apparatus of claim 1, wherein the thermoelectric module is to generate the cool air in response to receiving a signal from a computer to be docked in the apparatus, the signal indicating temperature of a device within the computer is at least equal to a predetermined threshold.

6. The apparatus of claim 1, wherein the thermoelectric module is to generate the cool air in response to receiving a signal from a computer to be docked in the apparatus, the signal indicating temperature of an ambient air within the computer is at least equal to a predetermined threshold.

7. A docking station comprising:

a thermoelectric module to generate cool air of a first temperature, the air of the first temperature to be feed into a computer to be docked in the apparatus, exclusive of a duct extending into apertures of the computer, and the thermoelectric module to generate warm air of a second temperature, a first side of the thermoelectric module including a heat exchanger with a fan, and a second side of the thermoelectric module includes a heat exchanger with a fan.

8. The docking station of claim 7, wherein the apparatus further includes a duct to transfer the cool air from the thermoelectric module to the computer to be docked in the apparatus.

9. The docking station of claim 8, wherein the heat exchanger on the first side of the thermoelectric module is smaller than the heat exchanger on the second side of the thermoelectric module.

10. The docking station of claim 7, wherein a heat pipe is attached to the second side of the thermoelectric module, the heat pipe to transfer heat from the second side to a remote heat exchanger.

11. The docking station of claim 7, wherein the thermoelectric module is to generate the cool air in response to receiving a signal from a computer to be docked in the apparatus, the signal indicating temperature of a device within the computer is at least equal to a predetermined threshold.

12. The docking station of claim 7, wherein the thermoelectric module is to generate the cool air in response to receiving a signal from a computer to be docked in the apparatus, the signal indicating temperature of an ambient air within the computer is at least equal to a predetermined threshold.

13. A method comprising:

a thermoelectric module generating cool air of a first temperature;

the thermoelectric module generating warm air of a second temperature, the thermoelectric module includes a first side generating the cool air, and a second side generating the warm air, the first side opposite the first side, the first side of the thermoelectric module including a heat exchanger with a fan, and the second side of the thermoelectric module includes a heat exchanger with a fan;

feeding the air of the first temperature into a computer docked in a station, exclusive of a duct extending into an apertures of the computer.

14. The method of claim 13, further including a duct transferring the cool air from the thermoelectric module to the computer.

15. The method of claim 13, further including a heat pipe attached to the second side of the thermoelectric module transferring heat away from the second side to a remote heat exchanger.

16. The method of claim 13, further including receiving a signal from a computer, the signal indicating temperature of a device within the computer is at least equal to a predetermined threshold; and in response to the signal indicating temperature of the device within the computer is at least equal to a predetermined threshold, the thermoelectric module generates the cool air.

17. The method of claim 13, further including receiving a signal from a computer, the signal indicating temperature of an ambient air within the computer is at least equal to a predetermined threshold; and in response to the signal indicating temperature of the ambient air within the computer is at least equal to a predetermined threshold, the thermoelectric module generates the cool air.

* * * * *